(12) United States Patent
DeHaan et al.

(10) Patent No.: US 8,719,392 B2
(45) Date of Patent: May 6, 2014

(54) SEARCHING A MANAGED NETWORK FOR SETTING AND CONFIGURATION DATA

(75) Inventors: Michael Paul DeHaan, Morrisville, NC (US); Adrian Karstan Likins, Raleigh, NC (US); Seth Kelby Vidal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 554 days.

(21) Appl. No.: 12/394,627

(22) Filed: Feb. 27, 2009

(65) Prior Publication Data

US 2010/0223375 A1    Sep. 2, 2010

(51) Int. Cl.
*G06F 15/16* (2006.01)

(52) U.S. Cl.
USPC .......................... 709/223; 709/220; 715/736

(58) Field of Classification Search
USPC ........................... 709/220–224; 715/733–740
See application file for complete search history.

(56) References Cited

U.S. PATENT DOCUMENTS

| | | | |
|---|---|---|---|
| 6,154,128 A | 11/2000 | Wookey et al. | |
| 6,263,455 B1 | 7/2001 | Bannister | |
| 6,327,677 B1 | 12/2001 | Garg et al. | |
| 6,529,784 B1 | 3/2003 | Cantos et al. | |
| 6,611,869 B1 * | 8/2003 | Eschelbeck et al. | 709/228 |
| 6,636,521 B1 | 10/2003 | Giulianelli | |
| 6,721,880 B1 | 4/2004 | Pike | |
| 6,915,457 B1 | 7/2005 | Miller | |
| RE39,717 E | 7/2007 | Yates et al. | |
| 7,240,106 B2 * | 7/2007 | Cochran et al. | 709/222 |
| 7,373,553 B2 | 5/2008 | Tripp et al. | |
| 7,441,021 B1 | 10/2008 | Perry | |
| 7,660,824 B2 | 2/2010 | Halpern et al. | |
| 7,693,966 B2 | 4/2010 | Schmid | |
| 7,769,990 B1 | 8/2010 | Okcu et al. | |
| 7,856,496 B2 | 12/2010 | Kline | |
| 7,865,578 B1 | 1/2011 | Gerraty | |
| 2002/0184349 A1 | 12/2002 | Manukyan | |
| 2003/0055931 A1 | 3/2003 | Cravo De Almeida et al. | |
| 2003/0061323 A1 | 3/2003 | East et al. | |
| 2003/0120754 A1 * | 6/2003 | Muto et al. | 709/220 |
| 2003/0177412 A1 | 9/2003 | Todd | |
| 2003/0208589 A1 | 11/2003 | Yamamoto | |
| 2004/0006546 A1 | 1/2004 | Wedlake et al. | |
| 2004/0032625 A1 | 2/2004 | Yamano | |
| 2004/0034577 A1 | 2/2004 | Van Hoose et al. | |
| 2004/0198319 A1 | 10/2004 | Whelan et al. | |
| 2004/0230828 A1 | 11/2004 | DeFuria et al. | |
| 2005/0066218 A1 | 3/2005 | Stachura et al. | |
| 2005/0198196 A1 | 9/2005 | Bohn et al. | |
| 2006/0004806 A1 | 1/2006 | Kraft | |
| 2006/0031188 A1 | 2/2006 | Lara et al. | |
| 2006/0050862 A1 | 3/2006 | Shen et al. | |
| 2006/0075294 A1 | 4/2006 | Ma et al. | |
| 2006/0161444 A1 | 7/2006 | Lubrecht et al. | |
| 2007/0005661 A1 | 1/2007 | Yang | |

(Continued)

*Primary Examiner* — David Lazaro
(74) *Attorney, Agent, or Firm* — Lowenstein Sandler LLP

(57) ABSTRACT

A network management server can be configured to search the components of computing systems and devices in a managed network for specified settings and configurations in order to determine if the computing systems or devices contain the specified settings and configurations. The network management server can receive a request containing search parameters. The search parameters can identify specific settings and configurations to search for in the components of the systems and devices of the managed network. The network management server can initiate a search of the components of all the systems and devices in the managed network based on the search parameters.

17 Claims, 5 Drawing Sheets

```
                    SEARCH RESULTS
        ┌─────────────────────────────────────────────┐
        │ SEARCH: network path = /etc/foo.config       │
  355   │         "and"                                │
        │         network path = /system/foo.config    │
        │                                              │
        │ Results - network path = /etc/foo.config     │
        │   Machine ID : 0005   Location : webserver.config │
        │   Machine ID : 0010   Location : webserver.config │
        │   Machine ID : 0012   Location : webserver.config │
        │ Results - network path = /system/foo.config  │
        │   Machine ID : 0010   Location : webserver.config │
        │ Results - "and"                              │
        │   Machine ID : 0010   Location : webserver.config │
        └─────────────────────────────────────────────┘

350
```

(56) References Cited

U.S. PATENT DOCUMENTS

| | | |
|---|---|---|
| 2007/0027936 A1 | 2/2007 | Stakutis et al. |
| 2007/0038679 A1 | 2/2007 | Ramkumar et al. |
| 2007/0074077 A1 | 3/2007 | Markow et al. |
| 2007/0121527 A1 | 5/2007 | Zhou et al. |
| 2007/0266124 A1 | 11/2007 | Kinyon et al. |
| 2007/0288530 A1 | 12/2007 | Romem et al. |
| 2008/0016186 A1 | 1/2008 | Ball |
| 2008/0091466 A1 | 4/2008 | Butler et al. |
| 2008/0209033 A1 | 8/2008 | Ginter et al. |
| 2008/0219563 A1 | 9/2008 | Moroney |
| 2008/0244047 A1 | 10/2008 | Yeung et al. |
| 2009/0070442 A1 | 3/2009 | Kacin et al. |
| 2009/0132698 A1 | 5/2009 | Barnhill, Jr. |
| 2009/0193413 A1 | 7/2009 | Lee |
| 2009/0276620 A1 | 11/2009 | McCarron et al. |
| 2009/0276772 A1 | 11/2009 | Garrett et al. |
| 2009/0300180 A1 | 12/2009 | DeHaan et al. |
| 2010/0077076 A1 * | 3/2010 | Wada ............................ 709/224 |
| 2010/0088197 A1 | 4/2010 | DeHaan |
| 2010/0131625 A1 | 5/2010 | DeHaan et al. |
| 2010/0185590 A1 | 7/2010 | D'Angelo et al. |
| 2010/0198964 A1 | 8/2010 | Tanaka |
| 2010/0218014 A1 | 8/2010 | Bozek et al. |
| 2010/0223274 A1 | 9/2010 | DeHaan |
| 2010/0275064 A1 | 10/2010 | DeCusatis et al. |
| 2010/0306334 A1 | 12/2010 | DeHaan |
| 2010/0306347 A1 | 12/2010 | DeHaan |
| 2010/0306359 A1 | 12/2010 | DeHaan |
| 2011/0047414 A1 | 2/2011 | Kudo et al. |
| 2011/0055361 A1 | 3/2011 | DeHaan |
| 2011/0055636 A1 | 3/2011 | DeHaan |
| 2011/0055669 A1 | 3/2011 | DeHaan |
| 2011/0055810 A1 | 3/2011 | DeHaan |
| 2011/0078301 A1 | 3/2011 | DeHaan |
| 2011/0107299 A1 | 5/2011 | DeHaan |

* cited by examiner

SEARCHING A MANAGED NETWORK FOR SETTING AND CONFIGURATION DATA

FIELD

This invention relates generally to network management. In particular, the invention relates to systems and methods for search contents of a network.

DESCRIPTION OF THE RELATED ART

A variety of network management platforms exist to assist network administrators with installing and configuring network resources and services. In many platforms, a management server can be used to issue commands to hosts or other network nodes to manage the configuration of the network hosts, underlying clients or other devices. As part of the management of comparatively large-scale and other networks, changes are made to systems of the network and new systems are added and removed. Often, the different systems in the network inter-depend on each other. As changes are made to the systems, the changes can often affect multiple systems in the network. As such, the administrators must be able to identity different systems that can be affected by changes.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
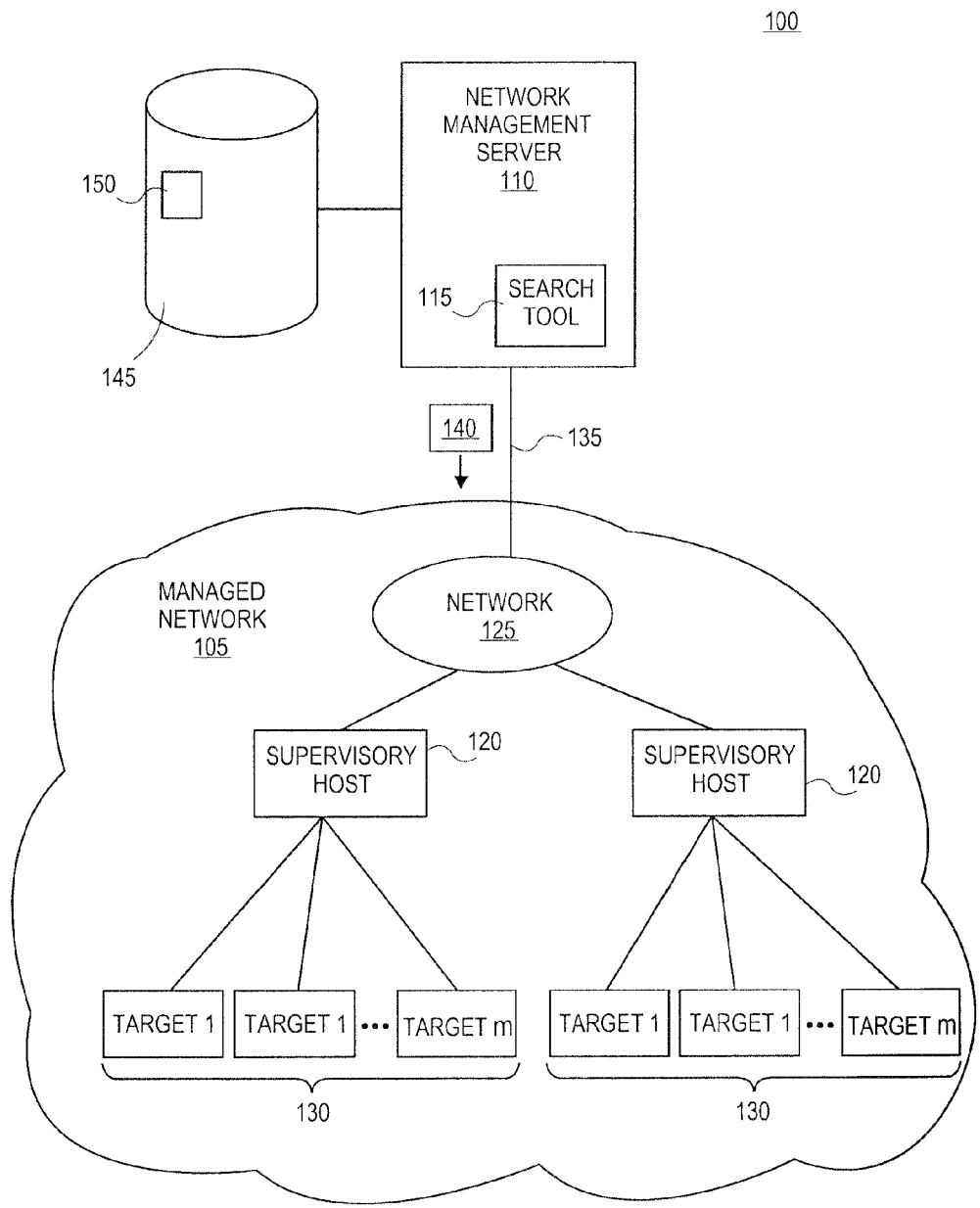
FIG. 1 illustrates an overall network managed by a network management server including a search tool, in which various embodiments of the present teachings can be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for managing a network of computing systems and devices. More particularly, a network management server can utilize a search tool to search the components of the computing systems and devices for specified settings and configurations.

According to embodiments, the network management server can be configured to search the components of computing systems and devices in a managed network for specified settings and configurations in order to determine if the computing systems or devices contain the specified settings and configurations. The network management server can be configured to utilize a search tool. The search tool can be configured to receive a request containing search parameters. The search parameters can identify specific settings and configurations to search for in the components of the systems and devices of the managed network.

According to embodiments, once the request is received, the search tool can be configured to initiate a search of the components of all the systems and devices in the managed network based on the search parameters. The search tool can be configured to individually search all the systems and devices to identify the systems and devices and components of the systems and devices that match the search parameters. Likewise, search tool can be configured to instruct the systems and devices to perform the search and return the identify the systems and devices and components of the systems and devices that match the search parameters.

According to embodiments, once the search is completed, the search tool and/or the network management server can be configured to categorize the search results (identify the systems and devices and components of the systems and devices that match the search parameters). Additionally, the search tool and/or the network management can be configured to store the search results and/or report the search results to the requester of the search or any other entity.

By utilizing the search tool, the network management server can search the entire network of managed computing systems and devices for specific settings and configurations. When changes occur affecting the specific setting and configurations, the network management server can quickly and efficiently locate computing systems and devices affected by the change without individually checking each system or device. As such, the network management server can reduce the time and effort of managing the network.

FIG. 1 illustrates an overall system 100 consistent with systems and methods for searching for setting and configuration data in a managed network 105, according to various embodiments of the present teachings. In embodiments as shown, a network management server 110 can maintain and manage the managed network 105 and can be configured to include a search tool 115.

In embodiments, the network management system 110 can be configured to communicate with a set of supervisory hosts 120 via one or more networks 125 in the managed network 105. The one or more networks 125 can be or include the Internet, or other public or private networks. The one or more or more networks 125 can be or include wired, wireless, optical, and other network connections.

In embodiment, the set of supervisory hosts 120 can be or include a set of servers configured to communicate with entities at other levels of the managed network 105 such as the one or more networks and/or associated connections. In embodiments, the set of supervisory hosts 120 can be configured to communicate with an intermediate set or sets of hosts, gateways, or servers. In embodiments, the set of supervisory hosts 120 can be configured to function as "overlord" hosts or servers which communicate with an underlying or low-level set of targets 130, or other devices in managed network 105. The set of target 130 can include any type of computing systems or other devices such as such as servers, personal computers, laptop computers, network-enabled media devices, networked stations, etc.

In embodiments, the set of supervisory hosts 120 can be configured to support or serve underlying managed networks in the managed network 105, for example via a local area network, or other network(s) or connections. Other hierarchies, topologies, and connections between network management server 110, the set of supervisory hosts 120, any intermediate hosts, the set of targets 130, and/or other entities or devices of the managed network 105 can be used.

In embodiments, communications between the network management server 110, the set of supervisory hosts 120, the set of targets 130, and/or other entities or devices in the managed network 105 or other entities can be conducted via one or more secure channels 135, such as the secure channel and related resources described in co-pending U.S. patent application Ser. No. 12/130,424, filed May 30, 2008, entitled "SYSTEMS AND METHODS FOR REMOTE MANAGEMENT OF NETWORKED SYSTEMS USING SECURE MODULAR PLATFORM" (U.S. Patent Application Publication No. 2009/0300180) assigned to or under an obligation of assignment to the same entity as this application, Red Hat Corporation, the disclosure of which is incorporated herein, in its entirety, by reference.

In embodiments, the network management sever 110 can include or access resources to support the generation and transmission of one or more discovery commands 140 via auto-discovered or other pathways to manage the set of supervisory hosts 120, the set of targets 130, and/or other entities or devices of the managed network 105. For example, the network management server 110 can be configured to include a network store 145. The network store 145 can be or include a database or other data store, and in embodiments can store information and data such as a network map 150. The network map 150 can be configured to record information related to the configuration and topology of network connections between the set of supervisory hosts 120, the set of targets 130, and/or other entities or devices of the managed network 105, as well as other data. For example, the network map 150 can be recorded in a file, tree, database, or other record. The network management server 110 can be configured to maintain the network store 145 in a storage device or system (CD, DVD, hard drive, portable storage memory, database etc.) whether local to the network management server 110 or remotely located.

In embodiments, the network management server 110 can be configured to utilize the search tool 115 to search the managed network 105. The search tool 115 can be configured to search the managed network 105 for particular settings or configurations of the set of supervisory hosts 120, the set of targets 130, and/or other entities or devices of the managed network 105. The search tool 115 enables the network management server 110 to search the entire managed network 105, in one action, for particular settings or configurations in the managed network 105. The search tool 115 can search the managed network 105 for particular settings and configurations contained in the files, installed software, stored data, configuration data of hardware and resources, etc., of the set of supervisory hosts 120, the set of targets 130, and/or other entities or devices of the managed network 105.

In embodiments, to initiate a search, the search tool 115 can be configured to receive one or more search parameters. To enable this, the search tool 115 can be configured to include the necessary logic, commands, and protocols to receive one or more search parameters. For example, the search tool can be configured to include one or more application programming interfaces (APIs) to receive the search parameters and/or to generate graphic user interfaces (GUIs) that allow an entity to enter the search parameters. The one or more received search parameters can specify, to the search tool 115, particular settings and configurations to search for in the managed network 105. The search tool 115 can receive the one or more search parameters from any source such as the operator or administrator of the network management server 110, one or more of the set of supervisory hosts 120, one or more of the set of targets 130, other entities or devices of the managed network 105, and/or any other source communicating with the network management server 110.

In embodiments, once the search parameters have been received, the search tool 115 can be configured to initiate a search of each of the set of supervisory hosts 120, the set of targets 130, and/or other entities or devices in the managed network 105 according to the received search parameters. The search tool 115 can be configured to configured to initiate the search of the managed network 105 via a secure channel such as the secure channel 135. Likewise, the search tool 115 can be configured to utilize the network map 150 to determine the configuration of the managed network 105 and the necessary information to communicate with the set of supervisory hosts 120, the set of targets 130, and/or other entities or devices of the managed network 105.

In embodiments, to search the managed network 105, the search tool 115 can be configured to include the necessary logic, commands and protocols to search the files, installed software, stored data, hardware and resource configuration data, etc. of the set of supervisory hosts 120, the set of targets 130, and/or other entities or devices of the managed network 105, according to the received search parameters. For example, the search tool 115 can be configured to include text based search or other search algorithms to search the files, installed software, stored data, hardware and resource configuration data, etc. of the set of supervisory hosts 120, the set of targets 130, and/or other entities or devices of the managed network 105, according to the received search parameters.

In embodiments, to search the managed network 105, the search tool 115 can be configured to instruct, via the secure channel 135, the set of supervisory hosts 120, the set of targets 130, and/or other entities or devices of the managed network 105 to conduct the search. The search tool 115 can be configured to receive the results of the search via the secure channel 135.

In embodiments, whether conducted by the search tool 115 or each system in the managed network 105, the search can be configured to identify the set of supervisory hosts 120, the set of targets 130, and/or other entities or devices of the managed network 105 that match the search parameters as well as identify the files, installed software, stored data, hardware and resource configuration data, etc. of the set of supervisory hosts 120, the set of targets 130, and/or other entities or devices of the managed network 105 that match the search parameters.

In embodiments, once the managed network is searched, the search tool 115 can be configured to collect and categorize the search results. Additionally, the network management server 110 and/or the search tool 115 can be configured to store the search results in the network store 145. Likewise, the network management server 110 and/or search tool 115 can be configured to output the search results in a report to the requester of the search. For example, the network management server 110 and/or search tool 115 can be configured to utilize the one or more APIs to transmit the categorized search results to the requester and/or to generate GUIs that allow the requester to view the categorized search results.

Figure 2:
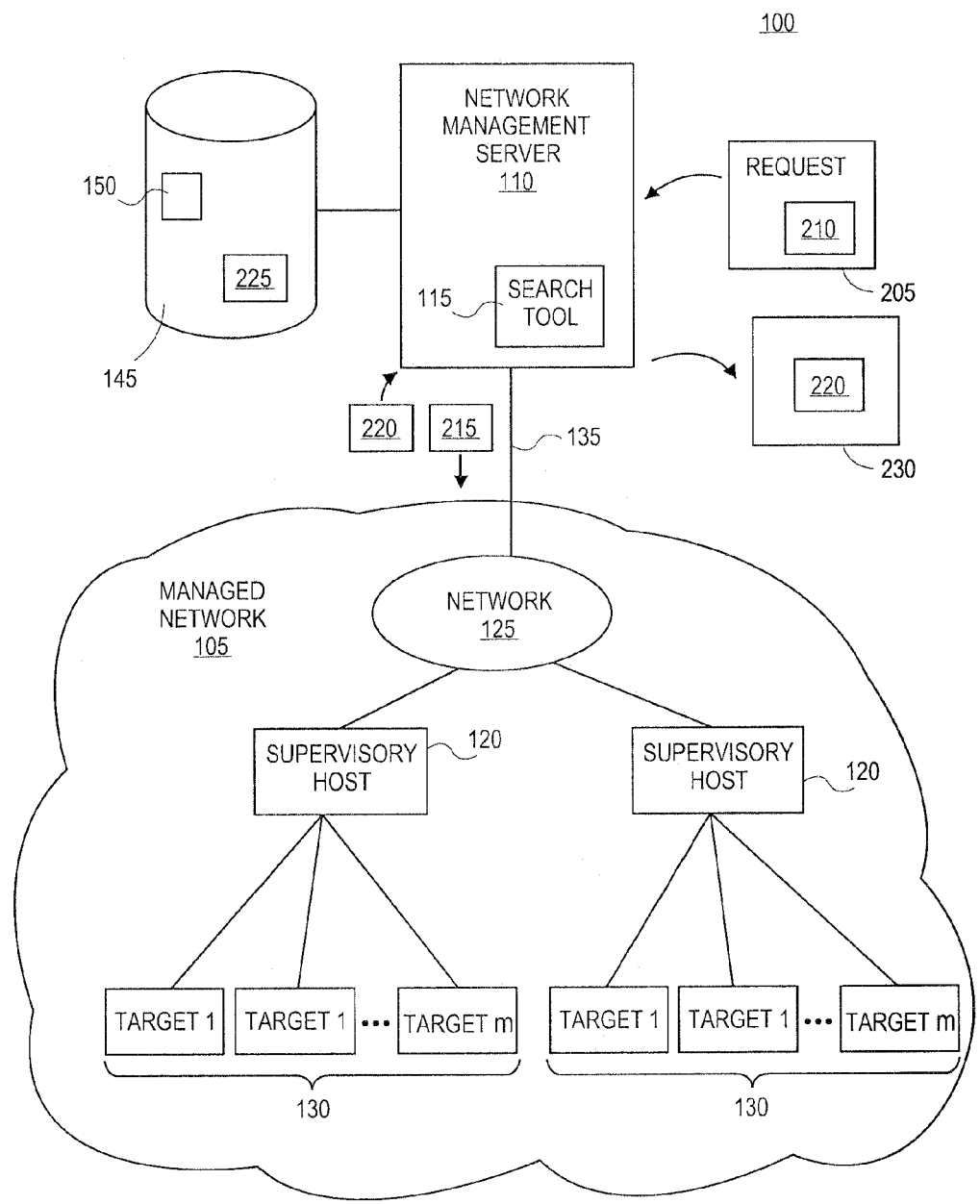
FIG. 2 illustrates the overall managed network in which the network management server can utilize the network tool to search systems in the network, according to various embodiments.

FIG. 2 illustrates an example of a search performed by the network management server 110, utilizing the search tool 115, on the managed network 105, according to embodiments. As illustrated, the network management server 110 can be configured to receive a request 205 to perform a search on the managed network 105. The network management server 110 can receive the request from any entity associated with the network management server 110 and/or the managed network 105.

The request 205 can include one or more search parameters 210 to serve as the basis for the search of the managed network 105. The one or more search parameters 210 can include settings and configurations to search for in the files, installed software, stored data, hardware and resource configuration data, etc. of the set of supervisory hosts 120, the set of targets 130, and/or other entities or devices of the managed network 105. The search parameters 210 can include a text string defining the particular settings and configurations to search for in the managed network 105. As one example, the search parameters 210 can include the text string "network path=/etc/foo.conf".

In embodiments, the requester of the search can desire to search the managed network 105 for a variety of reasons. For instance, in the above example, the network path "/etc/foo.conf", defined by the text string, can be insecure or no longer a valid path. As such, the requester can desire the identify any of the set of supervisory hosts 120, the set of targets 130, and/or other entities or devices of the managed network 105, which is still configured with this network path, and can desire to identify the particular files, installed software, stored data, hardware and resource configuration data, etc. of the set of supervisory hosts 120, the set of targets 130, and/or other entities or devices of the managed network 105, which are still configured with this network path.

In embodiments, the search parameters 210 can include additional search logic on which to base the search. For example, if the search parameters 210 include multiple text strings, the search parameters 210 can include logical operators, such as "and", "or", "not", etc., to define the relationship of the text strings. For instance, the search parameters 210 can include the text string "network path=/etc/foo.conf" and "network path=/system/foo.conf" joined by the logical operator "or". In this example, the requester can desire to identify any of the set of supervisory hosts 120, the set of targets 130, and/or other entities or devices of the managed network 105, which contain either network path in their settings and configurations.

In embodiments, once the request 205 is received, the network management server 110 can utilize the search tool 115 to initiate a search of the managed network 105 according to the search parameters 210. To achieve this, the search tool 115 can be configured to access the network map 150 to determine the identification of and the information for communicating with the set of supervisory hosts 120, the set of targets 130, and/or other entities or devices of the managed network 105.

In embodiments, once identified, the search tool 115 can be configured to initiate a search of each of the set of supervisory hosts 120, the set of targets 130, and/or other entities or devices of the managed network 105 according to the search parameters 210, via the secure channel 135. The search tool 115 can be configured to search the files, installed software, stored data, hardware and resource configuration data, etc. of the set of supervisory hosts 120, the set of targets 130, and/or other entities or devices of the managed network 105, according to the search parameters 210.

In embodiments, alternatively to initiate the search, the search tool 115 can be configured to transmit a request 215 to the set of supervisory hosts 120, the set of targets 130, and/or other entities or devices of the managed network 105. The request 215 can be configured instruct each of the set of supervisory hosts 120, the set of targets 130, and/or other entities or devices of the managed network 105 to perform the search of the files, installed software, stored data, hardware and resource configuration data, etc., according to the search parameters 210.

In embodiments, once completed, the search tool 115 can be configured to collect an identification 220 of the set of supervisory hosts 120, the set of targets 130, and/or other entities or devices of the managed network 105, which meet the search parameters 210. Additionally, the identification 220 can also include information identifying the specific files, installed software, stored data, hardware and resource configuration data, etc., which meet the search parameters 210. Likewise, if the search tool 115 transmitted a request 215, the search tool 115 can be configured to receive the identification 220 from any of the set of supervisory hosts 120, the set of targets 130, and/or other entities or devices of the managed network 105, which meet the search parameters 210.

In embodiments, once the search is performed, the network management 110 and/or search tool 115 can be configured to store the identification 220 as search results 225 identifying the specific files, installed software, stored data, hardware and resource configuration data, etc., of the set of supervisory hosts 120, the set of targets 130, and/or other entities or devices of the managed network 105, which meet the search parameters 210. The network management 110 and/or search tool 115 can be configured to store the search results 225 in the network store 145. The network management 110 and/or search tool 115 can be configured to categorize the identification 220 in the search results 225 in any logical manner. The identification 220 in the search results 225 can be categorized according the search parameters 210, the structure of the managed network 105, or any other structure.

In embodiments, once the search is performed, the network management 110 and/or search tool 115 can be configured to generate a report 230 to provide to the requester of the search. The network management 110 and/or search tool 115 can be configured to categorize the identification 220 in the report 230 in any logical manner. The identification 220 in the report 230 can be categorized according the search parameters 210, the structure of the managed network 105, or any other structure. The network management 110 and/or search tool 115 can transmit the report 230 to the requester and/or generate GUIs that allow the requester to view the report 230.

Figure 3A:
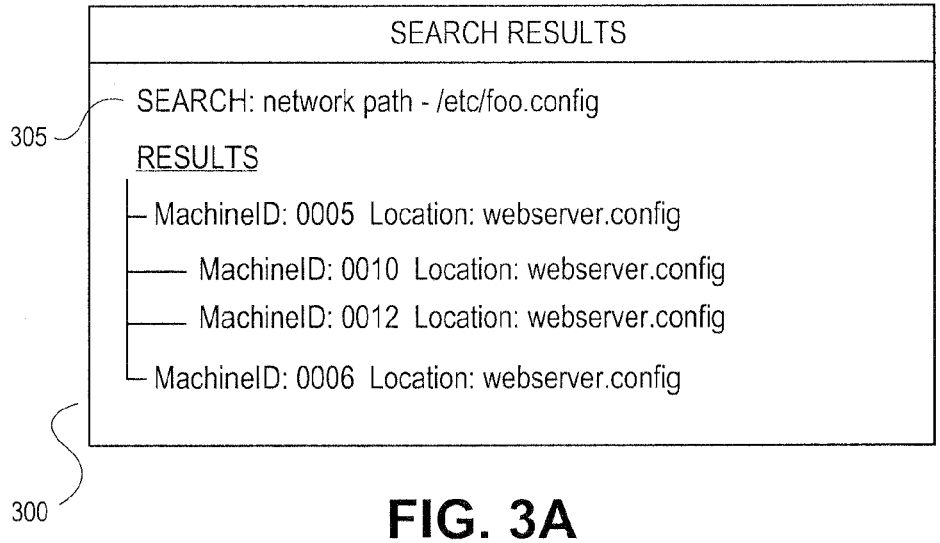
FIGS. 3A and 3B illustrate exemplary search reports, according to various embodiments.
Figure 3B:
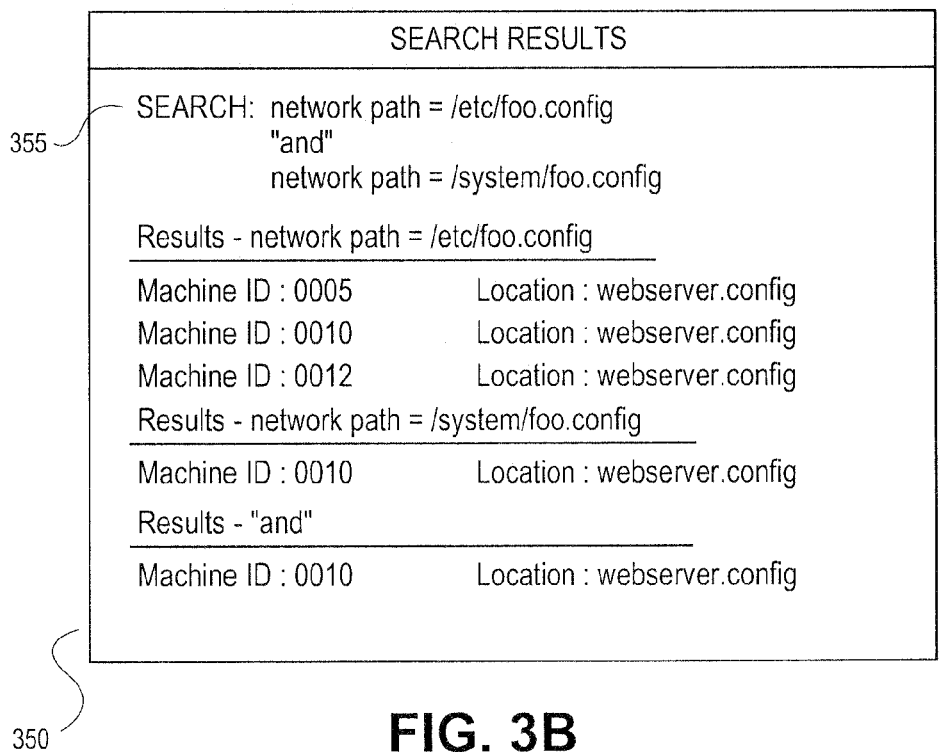

FIGS. 3A and 3B illustrate two example reports 300 and 350 of the report 230. As illustrated in FIG. 3A, the network management 110 and/or search tool 115 can be configured to generate the report 300 for the exemplary search parameters 305 being the text string "network path=/etc/foo.conf". The network management 110 and/or search tool 115 can generate the report 300 such that the identification of the specific files, installed software, stored data, hardware and resources configuration data, etc. of the set of supervisory hosts 120, the set of targets 130, and/or other entities or devices of the managed network 105, which meet the search parameters 305 are arranged according to organization of the managed network 105. That is, the results are structured according to the topology of the managed network 105 with lower systems in the topology being offset below higher ordered systems.

As illustrated in FIG. 3B, the network management 110 and/or search tool 115 can be configured to generate the report 350 for the exemplary search parameters 355 being the text string "network path=/etc/foo.conf" and "network path=/system/foo.conf" joined by the logical operator "and". The network management 110 and/or search tool 115 can generate the report 350 such that the identification of the specific files, installed software, stored data, hardware and resources configuration data, etc. of the set of supervisory hosts 120, the set of targets 130, and/or other entities or devices of the managed network 105, which meet the search parameters 355 are arranged according the search parameters 355. That is, the search results are arranged according to each text string and the combination of the text strings according to the logical operator.

Figure 4:
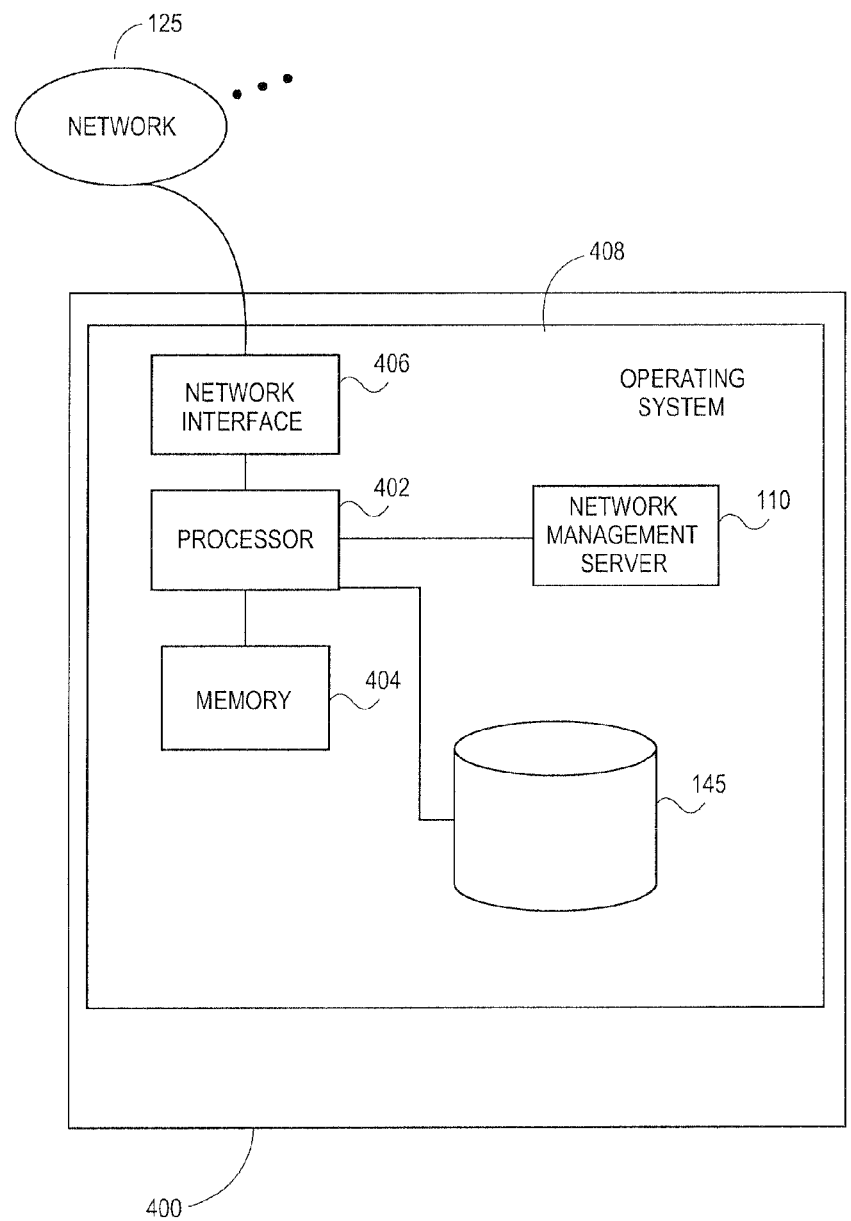
FIG. 4 illustrates an exemplary hardware configuration for a network management server, according to various embodiments.

FIG. 4 illustrates an exemplary diagram of hardware and other resources that can be incorporated in a computing system 400 configured to communicate with the network 125, and execute the network management server 110, including the search tool 115, according to embodiments. In embodiments as shown, the computing system 400 can comprise a processor 402 communicating with memory 404, such as electronic random access memory, operating under control of or in conjunction with operating system 408. Operating system 408 can be, for example, a distribution of the Linux™ operating system, the Unix™ operating system, or other open-source or proprietary operating system or platform. Processor 402 also communicates with the network store 145, such as a database stored on a local hard drive. While illustrated as a local database in computing system 400, the network store 145 can be separate from the computing system 400 and the network management server 110 can be configured to communicate with the remote network store 145.

Processor 402 further communicates with network interface 406, such as an Ethernet or wireless data connection, which in turn communicates with one or more networks 125, such as the Internet or other public or private networks. Processor 402 also communicates with the network store 145, the network management server 110, and the search tool 115, to execute control logic and perform the search processes described above and below.

As illustrated, the network management server 110 can be implemented as a software application or program capable of being executed by a conventional computer platform. Likewise, the network management server 110 can also be implemented as a software module or program module capable of being incorporated in other software applications and programs. In either case, the network management server 110 can be implemented in any type of conventional proprietary or open-source computer language.

As illustrated, the search tool 115 can be implemented as a software module or program module capable of being incorporated in other software applications and programs, such as the network management server 110. Likewise, the search tool 115 can be implemented as a software application or program capable of being executed, independently, by a conventional computer platform. In either case, the search tool 115 can be implemented in any type of conventional proprietary or open-source computer language.

Figure 5:
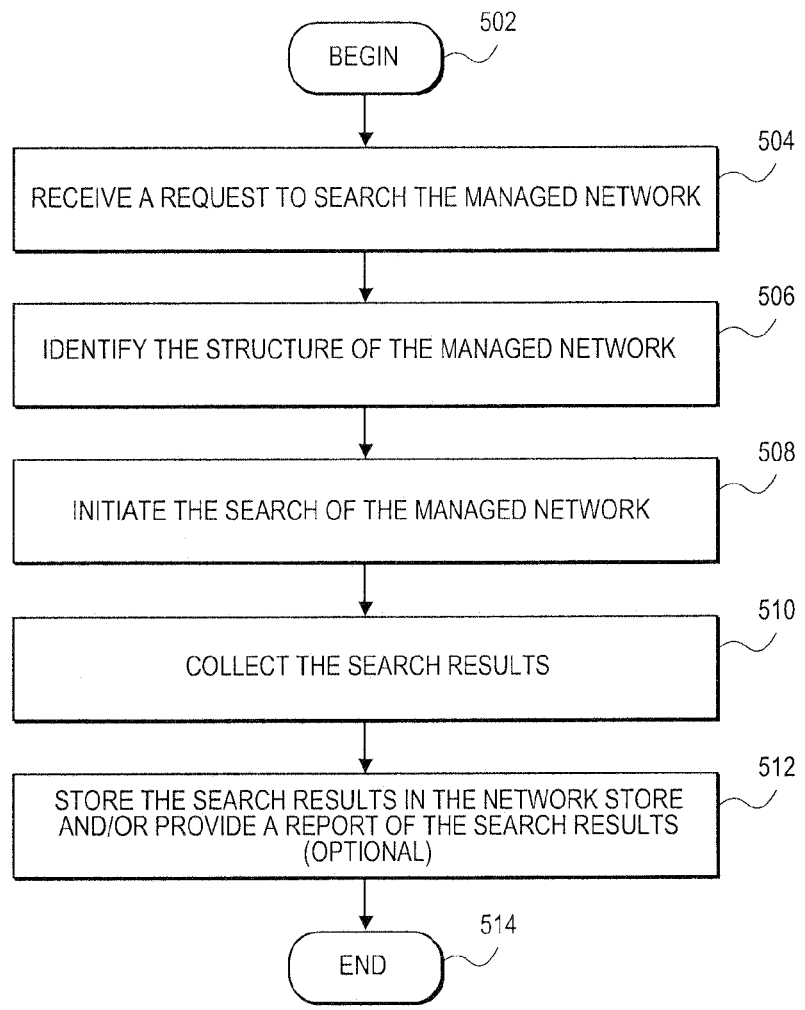
FIG. 5 illustrates a flowchart for searching systems in a network, according to various embodiments.

FIG. 5 illustrates a flow diagram for searching a managed network 105, according to embodiments of the present teachings. In 502, the process can begin. In 504, the network management server 110 can receive a request 205 to search the managed network 105. The network management server 110 can receive the request from any entity associated with the network management server 110 and/or the managed network 105. The request 205 can include one or more search parameters 210 to serve as the basis for the search of the managed network 105. The one or more search parameters 210 can include settings and configurations to search for in the files, installed software, stored data, hardware and resource configuration data, etc. of the set of supervisory hosts 120, the set of targets 130, and/or other entities or devices of the managed network 105.

In 506, the network management server 110 can identify the structure of the managed network 105. For example, the search tool 115 can utilize the network map 150 to determine the configuration of the managed network 105 and the necessary information to communicate with the set of supervisory hosts 120, the set of targets 130, and/or other entities or devices of the managed network 105.

In 508, the network management server 110 can initiate the search of the managed network 105. For example, the search tool 115 can search the files, installed software, stored data, hardware and resource configuration data, etc. of the set of supervisory hosts 120, the set of targets 130, and/or other entities or devices of the managed network 105, according to the search parameters 210. Alternatively, for example, the search tool 115 can transmit a request 215 to the set of supervisory hosts 120, the set of targets 130, and/or other entities or devices of the managed network 105. The request 215 can be configured instruct each of the set of supervisory hosts 120, the set of targets 130, and/or other entities or devices of the managed network 105 to perform the search of the files, installed software, stored data, hardware and resource configuration data, etc., according to the search parameters 210.

In 510, the network management server 110 can collect the search results 220. For example, the search tool 115 can collect an identification 220 of the set of supervisory hosts 120, the set of targets 130, and/or other entities or devices of the managed network 105, which meet the search parameters 210. Additionally, the identification 220 can also include information identifying the specific files, installed software, stored data, hardware and resource configuration data, etc., which meet the search parameters 210. Likewise, if the search tool 115 transmitted a request 215, the search tool 115 can receive the identification 220 from any of the set of supervisory hosts 120, the set of targets 130, and/or other entities or devices of the managed network 105, which meet the search parameters 210.

In 512, the network management server 110 can optionally store the search results 220 in the network store 145 and/or provide a report 230 of the search results 220. For example, the network management 110 and/or search tool 115 can store the identification 220 as search results 225 identifying the specific files, installed software, stored data, hardware and resource configuration data, etc., of the set of supervisory hosts 120, the set of targets 130, and/or other entities or devices of the managed network 105, which meet the search parameters 210. The network management 110 and/or search tool 115 can categorize the identification 220 in the search results 225 in any logical manner. The identification 220 in the search results 225 can be categorized according the search parameters 210, the structure of the managed network 105, or any other structure.

Additionally, for example, the network management 110 and/or search tool 115 can generate a report 230 to provide to the requester of the search. The network management 110 and/or search tool 115 can categorize the identification 220 in the report 230 in any logical manner. The identification 220 in the report 230 can be categorized according the search parameters 210, the structure of the managed network 105, or any other structure.

In 514, the process can end, but the process can return to any point and repeat.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
   receiving, by a processor, a request to search a set of devices in a network, wherein the request comprises a set of search parameters comprising a device configuration;
   establishing a secure channel with the set of devices in the network;
   determining a topology of the network;
   initiating, over the secure channel, a search of the set of devices for a device having a configuration that matches the set of search parameters in view of the determined topology of the network; and
   collecting an identification of at least one of the set of devices having a matching configuration.

2. The method of claim 1, the method further comprising:
   storing the identification of identified devices in a network store.

3. The method of claim 1, the method further comprising:
   categorizing the identification of the identified devices;
   generating a report comprising the categorized identification of the identified devices; and
   providing the report to a source of the request.

4. The method of claim 1, wherein initiating, over the secure channel, the search of the set of devices comprises:
   searching configurations of components of each device in the set of devices to find each device having a configuration that is equivalent to the at least one configuration in the set of search parameters.

5. The method of claim 1, wherein initiating, over the secure channel, the search of the set of devices comprises:
   instructing each device in the set of devices to search configurations of components of each device for a configuration that is equivalent to the configuration in the set of search parameters.

6. The method of claim 1, wherein initiating the search of the set of devices comprises sending the received request to a plurality of supervisory hosts to request that the supervisory hosts perform a search of a plurality of target devices managed by each supervisory host.

7. A system comprising:
   a set of devices;
   a network interface to the set of devices; and
   a network management server, to communicate with the network interface, the network management server to execute operations comprising:
   receiving a request to search a set of devices in the network, wherein the request comprises a set of search parameters comprising a device configuration;
   establishing a secure channel with the set of devices in the network;
   determining a topology of the network;
   initiating, over the secure channel, a search of the set of devices for a device having a configuration that matches the set of search parameters in view of the determined topology of the network; and
   collecting an identification of at least one of the set of devices having a matching configuration.

8. The system of claim 7, the network management server further to:
   store the identification of identified devices in a network store.

9. The system of claim 7, the network management server further to:
   categorize the identification of the identified devices;
   generate a report comprising the categorized identification of the identified devices; and
   provide the report to a source of the request.

10. The system of claim 7, wherein initiating, over the secure channel, the search of the set of devices comprises:
    searching configurations of components of each device in the set of devices to find each device having a configuration that is equivalent to the at least one configuration in the set of search parameters.

11. The system of claim 7, wherein initiating, over the secure channel, the search of the set of devices comprises:
    instructing each device in the set of devices to search configurations of components of each device for a configuration that is equivalent to the configuration in the set of search parameters.

12. The system of claim 7, wherein initiating the search of the set of devices comprises sending the received request to a plurality of supervisory hosts to request that the supervisory hosts perform a search of a plurality of target devices managed by each supervisory host.

13. A non-transitory machine-readable storage medium having instructions, which when executed by a processor, cause the processor to execute operations comprising:
    receiving, by the processor, a request to search a set of devices in the network, wherein the request comprises a set of search parameters comprising a device configuration;
    establishing a secure channel with the set of devices in the network;
    determining a topology of the network;
    initiating, over the secure channel, a search of the set of devices for a device having a configuration that matches the set of search parameters in view of the determined topology of the network; and
    collecting an identification of at least one of the set of devices having a matching configuration.

14. The non-transitory machine-readable storage medium of claim 13, the operations further comprising:
    categorizing the identification of the identified devices;
    generating a report comprising the categorized identification of the identified devices; and
    providing the report to a source of the request.

15. The non-transitory machine-readable storage medium of claim 13, wherein initiating, over the secure channel, the search of the set of devices comprises:
    searching configurations of components of each device in the set of devices to find each device having a configuration that is equivalent to the at least one configuration in the set of search parameters.

16. The non-transitory machine-readable storage medium of claim 13, wherein initiating, over the secure channel, the search of the set of devices comprises:
   instructing each device in the set of devices to search configurations of components of each device for a configuration that is equivalent to the configuration in the set of search parameters.

17. The non-transitory machine-readable storage medium of claim 13, wherein initiating the search of the set of devices comprises sending the received request to a plurality of supervisory hosts to request that the supervisory hosts perform a search of a plurality of target devices managed by each supervisory host.

* * * * *